United States Patent [19]
Kitoh et al.

[11] Patent Number: 5,396,331
[45] Date of Patent: Mar. 7, 1995

[54] METHOD FOR EXECUTING THREE-DIMENSIONAL MEASUREMENT UTILIZING CORRECTIVELY COMPUTING THE ABSOLUTE POSITIONS OF CCD CAMERAS WHEN IMAGE DATA VARY

[75] Inventors: Hiroyuki Kitoh, Nagoya; Masatoshi Ohshima, Ama, both of Japan

[73] Assignee: Sanyo Machine Works, Ltd., Aichi, Japan

[21] Appl. No.: 103,911

[22] Filed: Aug. 10, 1993

[51] Int. Cl.⁶ .............................................. G01B 11/24
[52] U.S. Cl. ................................... 356/376; 356/375; 364/559
[58] Field of Search .................... 356/376, 4, 141, 2, 356/375; 250/558; 364/559; 348/96–99

[56] References Cited

U.S. PATENT DOCUMENTS

| | | | |
|---|---|---|---|
| 4,649,504 | 3/1987 | Krouglicof et al. | 356/141 |
| 4,841,460 | 6/1989 | Dewar et al. | 364/559 |
| 4,928,175 | 3/1990 | Haggren | 365/559 |
| 4,993,836 | 2/1991 | Furuhashi et al. | 356/376 |
| 5,100,229 | 3/1992 | Lundberg et al. | 356/4 |
| 5,267,143 | 11/1993 | Pryor | 364/559 |
| 5,285,397 | 2/1994 | Heier et al. | 356/375 |

*Primary Examiner*—F. L. Evans
*Assistant Examiner*—Jason D. Eisenberg
*Attorney, Agent, or Firm*—Nikaido, Marmelstein, Murray & Oram

[57] ABSTRACT

A method of measuring three-dimensional dimension of a object comprising the steps of installing two or more than two of CCD cameras, installing a plurality of reference-point members to at least four locations in the periphery of or on a measurable object, installing a reference bar having a known distance between a pair of points thereof, computing positions of respective measurable points based on image data transmitted from those CCD cameras, wherein a computer unit computes absolute positions of those CCD cameras based on horizontal and vertical angles of respective reference-point members and a pair of points of the reference bar against light axes of the installed CCD camera and also based on the distance between a pair of points of the reference bar, and then, the computer unit computes positions of respective measurable points based on processed data as reference. Whenever those image data vary, the computer unit correctively computes absolute positions of the installed CCD cameras.

1 Claim, 4 Drawing Sheets

METHOD FOR EXECUTING THREE-DIMENSIONAL MEASUREMENT UTILIZING CORRECTIVELY COMPUTING THE ABSOLUTE POSITIONS OF CCD CAMERAS WHEN IMAGE DATA VARY

BACKGROUND OF THE INVENTION

The present invention relates to a method of executing a three-dimensional measurement for measuring dimension of a measureable object such as an automotive body or a press mold or the like. More particularly, the invention relates to a method of measuring a three-dimensional dimension of a workpiece mounted on an objective position by providing a plurality of CCD cameras in position close to a measurable object.

When directly measuring dimension of a measurable workpiece A having cubic configuration like an automotive body in an assembly factory in place of a laboratory equipped with a variety of measuring instruments, normally, such a conventional method described below is executed.

As shown in FIG. 3, initially, a measuring jig B is secured to a predetermined measuring position in order to stably hold an objective workpiece A. Next, the objective workpiece A is positioned on the measuring jig B. At the same time, a pair of theodolites 1 and 2 are set to predetermined positions in front of a measurable surface of the positioned workpiece A.

Each of these theodolites 1 and 2 incorporates a high-precision telescope which is swingably held in the horizontal and vertical directions. When the measurable target point is caught in the center of the telescopic lens, horizontal and vertical angles of the telescope are externally displayed.

To securely measure dimensions of the measurable workpiece A in presence of the above condition, initially, a plurality of reference-point members C needed for determining positional relationship between a pair of theodolites 1 and 2 and the measurable workpiece A are installed to at least four locations in the periphery of the measurable workpiece A positioned on the measuring jig B. In addition, a reference bar F is placed on the positioned workpiece A or at any optional position in the periphery of the measurable workpiece A. The reference bar F has a known distance L between a pair of points D and E.

Next, a pair of theodolites 1 and 2 are activated to sequentially measure positions of a plurality of reference-point members C. In the meanwhile, those theodolites 1 and 2 sequentially transmit horizontal and vertical directional data to a computer system (not shown). After completing those sequential processes, the theodolites 1 and 2 respectively measure positions of a pair of points D and E of the reference bar F before transmitting those position data to the computer system. On receipt of those position data covering 6 points measured by those theodolites 1 and 2, based on these position data, the computer system computes relative positions and postures of those theodolites 1 and 2, and then, based on the position data, the computer system computes relative positions and postures of these theodolites 1 and 2, and then, based on the distance data L between a pair of points D and E of the reference bar F, the computer system computes absolute positions and postures of the theodolites 1 and 2.

After correctly identifying absolute positions and postures of those theodolites 1 and 2 set in front of the measurable workpiece A, these theodolites 1 and 2 sequentially measure predetermined positions on the surface of the workpiece A, and then, the computer system processes positional data of respective points via triangulation before completing measurement of three-dimensional dimension of the measurable workpiece A. FIG. 4 presents an operational flowchart of those sequential processes described above.

As mentioned above, by properly operating a pair of theodolites 1 and 2 and a computer system needed for processing positional data measured by those theodolites 1 and 2, three-dimensional dimension of an objective workpiece A can be measured in a factory that manufactures the workpiece A.

Nevertheless, when actually measuring dimension of an objective workpiece A in the factory, unwanted vibration is unavoidably transmitted to the floor of the measuring location from a variety of machine tools, factory workers walking around the measuring location, and workpiece carriers.

Because of this, positional relationship between those theodolites 1 and 2 and the objective workpiece A is easily variable to result in the significantly degraded measuring precision, thus causing critical problems.

In an extreme case, while those who are in charge of executing dimensional measurement are not aware of, factory workers or workpiece carriers may come into contact with either of those theodolites 1 and 2 or the measurable workpiece A to significantly vary the positional relationship between these. In consequence, abnormal result will be generated to oblige the measuring staff to repeatedly execute the three-dimensional measuring operation.

SUMMARY OF THE INVENTION

Therefore, the invention provides a novel method of measuring three-dimensional dimension of a measurable object by computing positions of a predetermined number of measuring points on the measurable object based on image data picked up by a plurality of CCD cameras. Concretely, a plurality of reference-point members are installed to at least four locations in the periphery of or on the measurable object, and in addition, a reference bar having a known distance between a pair of points is also provided. When a computer system computes positions of measurable points based on image data transmitted from those plural CCD cameras, initially, among those image data, based on horizontal and vertical angles of those reference-point members and a pair of points of the reference bar against light axes of a plurality of CCD cameras and also based on the distance between a pair of points of the reference bar, the computer system computes absolute positions of these CCD cameras, and then based on these data as reference, the computer system computes positions of measurable points, and in addition, whenever these image data vary, the computer system again computes absolute positions of those CCD cameras.

As described above, the novel method according to the invention securely achieves high-precision measurement of three-dimensional dimensions of a measurable object by initially computing absolute positions of a plurality of CCD cameras based on those data related to a plurality of reference-point members and a reference bar contained in image data transmitted from those plural CCD cameras before eventually computing measurable points based on image data.

DESCRIPTION OF THE PREFERRED EMBODIMENTS

Figure 1:
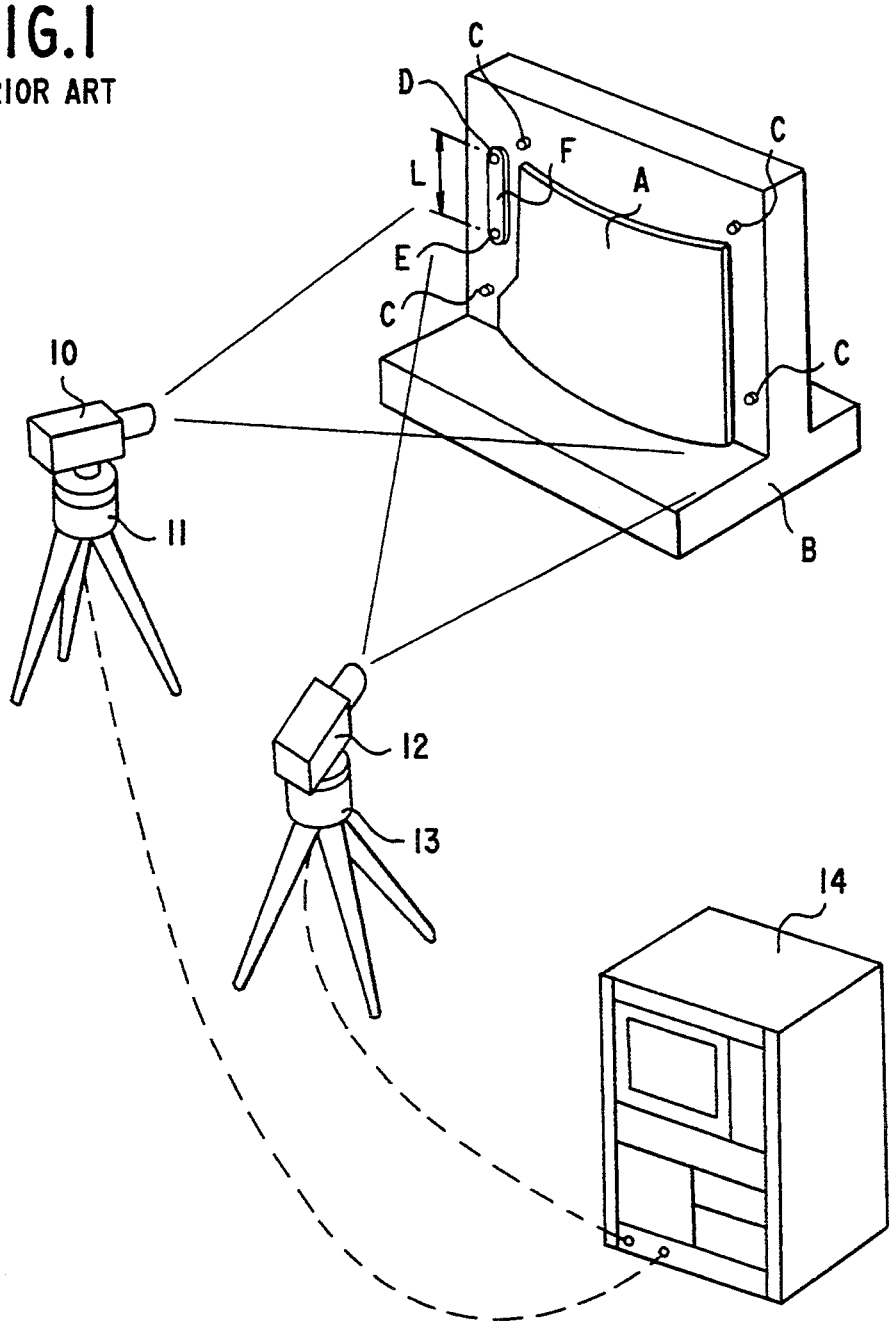
FIG. 1 is a perspective view showing an example of arrangement of a variety of measuring instruments while executing the method of measuring three-dimensional dimension of a measurable workpiece according to the method embodied by the invention.

FIG. 1 is a perspective view showing an example of arrangement of a variety of measuring instruments used for measuring three-dimensional dimension of a measurable workpiece according to the method embodied by the invention. The reference character A shown in FIG. 1 designates a measurable workpiece. The reference character B designates a measuring jig which stably positions and holds the measurable workpiece A. The reference character C designates four reference-point members which are disposed in the periphery of the measurable workpiece A. The reference character F designates a reference bar having a known distance between a pair of points D and E. These component members are respectively identical to those which are normally used for any conventional three-dimensional measuring system.

In order to facilitate a plurality of CCD cameras to execute three-dimensional measurement to be described later on, a plurality of light emitting diodes are built in the center of each reference-point member C and the center point between a pair of points D and E of the reference bar F. Light points of those light emitting diodes are respectively designated as the measurable points.

The reference numeral 10 shown in FIG. 1 designates a first CCD camera which is mounted on a tripod 11. The reference numeral 12 designates a second CCD camera which is mounted on a tripod 13. These first and second CCD cameras 10 and 12 are properly set to predetermined positions in front of a measurable workpiece A in a specific range in order that a measurable object A, those reference-point members C disposed in the periphery of the workpiece A, and the reference bar F, can properly be accommodated in each frame of those first and second CCD cameras 10 and 12.

The reference numeral 14 designates a computer unit incorporating an image processor which initially computes actual positions of the first and second CCD cameras 10 and 12 based on image data transmitted from these CCD cameras 10 and 12, and then computes three-dimensional dimension of the measurable workpiece A.

After correctly positioning the measurable workpiece A, the first and second CCD cameras 10 and 12, those reference-point members C, and the reference bar F, in order to measure three-dimensional dimension of the measurable workpiece A, as shown in FIG. 1, initially, image data of the measurable workpiece A including periphery of the workpiece A picked up by the first and second CCD cameras 10 and 12 are transmitted to the computer unit 14.

On receipt of image data, initially, among those image data from the first and second CCD cameras 10 and 12, the computer unit 14 computes horizontal and vertical angles of those four reference-point members C disposed in the periphery of the measurable workpiece A against the light axis of the first CCD camera 10, and simultaneously, it also computes horizontal and vertical angles of those reference-point members C against light axes of a pair of points D and E of the reference bar F. Next, in the same way as was done for the above process, among those image data received from the second CCD camera 12, the computer unit 14 computes horizontal and vertical angles of those four reference-point members C disposed in the periphery of the measurable workpiece A against light axis of the second CCD camera 12, and simultaneously, it also computes horizontal and vertical angles of those reference-point-members C against light axes of a pair of points D and E of the reference bar F.

Then, based on those data thus far processed, the computer unit 14 computes relative positions and postures (in other words, direction of light axes) of the first and second CCD cameras 10 and 12. Next, based on the distance L between points D and E of the reference bar F, the computer unit 14 computes absolute positions and postures of the first and second CCD cameras 10 and 12.

After correctly identifying absolute positions of the first and second CCD cameras 10 and 12, based on those data transmitted to the computer unit 14, the computer unit 14 computes horizontal and vertical angles of predetermined measurable points on the measurable workpiece A against light axes of those first and second CCD cameras 10 and 12, and then computes data of those measurable points based on triangulation to determine three-dimensional dimension of the workpiece A before completing the whole measuring processes.

A plurality of characteristic spots on the measurable workpiece A may be available for composing measurable points on the workpiece A. In the event that data of the whole measurable surfaces are needed, using a laser scanner, all the measurable surfaces of the workpiece A are sequentially irradiated by laser spot beam. In this case, using laser spot beam as a measuring point, whenever image data transmitted to the computer unit 14 vary in association with the shift of laser spot beam on the measurable surface, the computer unit 14 repeatedly executes all the computations described above in order to sequentially compute positions of respective points irradiated by laser spot beam. The permits the computer unit 14 to correctly identify overall dimension of the measurable surface to complete measurement of three-dimensional dimension of the measurable workpiece A.

Concretely, the computer unit 14 does not compute dimension of the objective workpiece A solely by means of a single-frame image data of the objective workpiece A, but the computer unit 14 computes dimension of the workpiece A from multi-frame image data of the workpiece A. Whenever image data vary, based on the method described above, the computer unit 14 initially computes absolute positions of a pair of CCD camera 10 and 12, and finally, based on the data of absolute positions of these CCD cameras 10 and 12, the computer unit 14 computes positions of measurable points.

In this way, when measuring dimension of the workpiece A by means of a pair of CCD cameras 10 and 12, since the computer unit 14 securely computes absolute positions of these CCD cameras 10 and 12 before computing actual positions of measurable points, even when the positional relationship may vary between those CCD cameras 10 and 12 and the objective workpiece A subsequent to transmission of unwanted vibration to the floor of the measuring location while spending a certain period of time for execution of measurement as in the case of measuring dimension of the workpiece A by sequentially irradiating surface of the workpiece A with laser spot beam like the above case, the varied positional relationship does not cause error to be generated in the measured result, and therefore, the three-dimensional measuring system embodied by the invention can constantly execute measurement of three dimensional dimension of the objective workpiece A with extreme precision.

Figure 2:
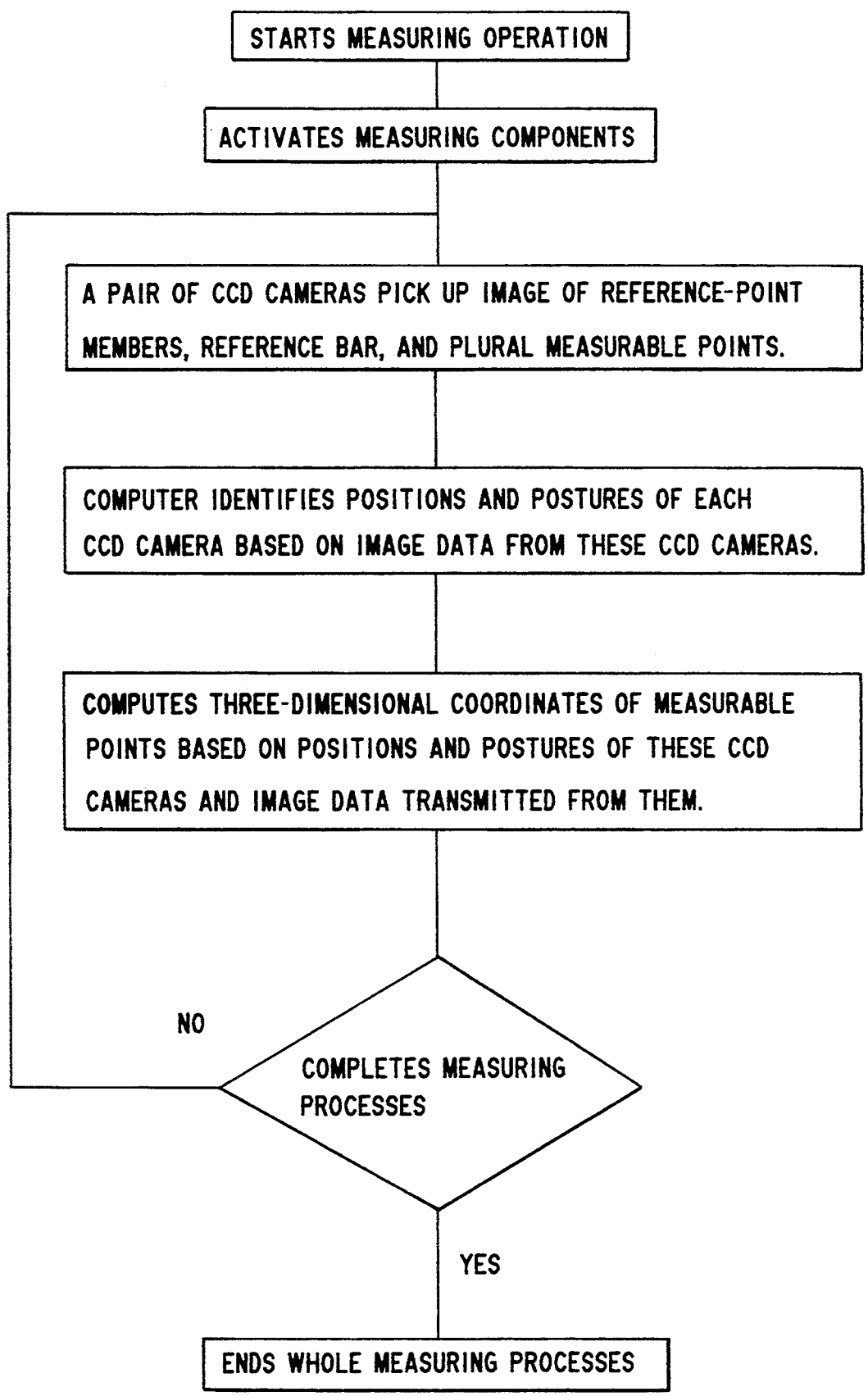
FIG. 2 is an operational flowcart designating procedure to implement the method of measuring three-dimensional dimension of a measurable workpiece according to an embodiment of the invention.
Figure 3:
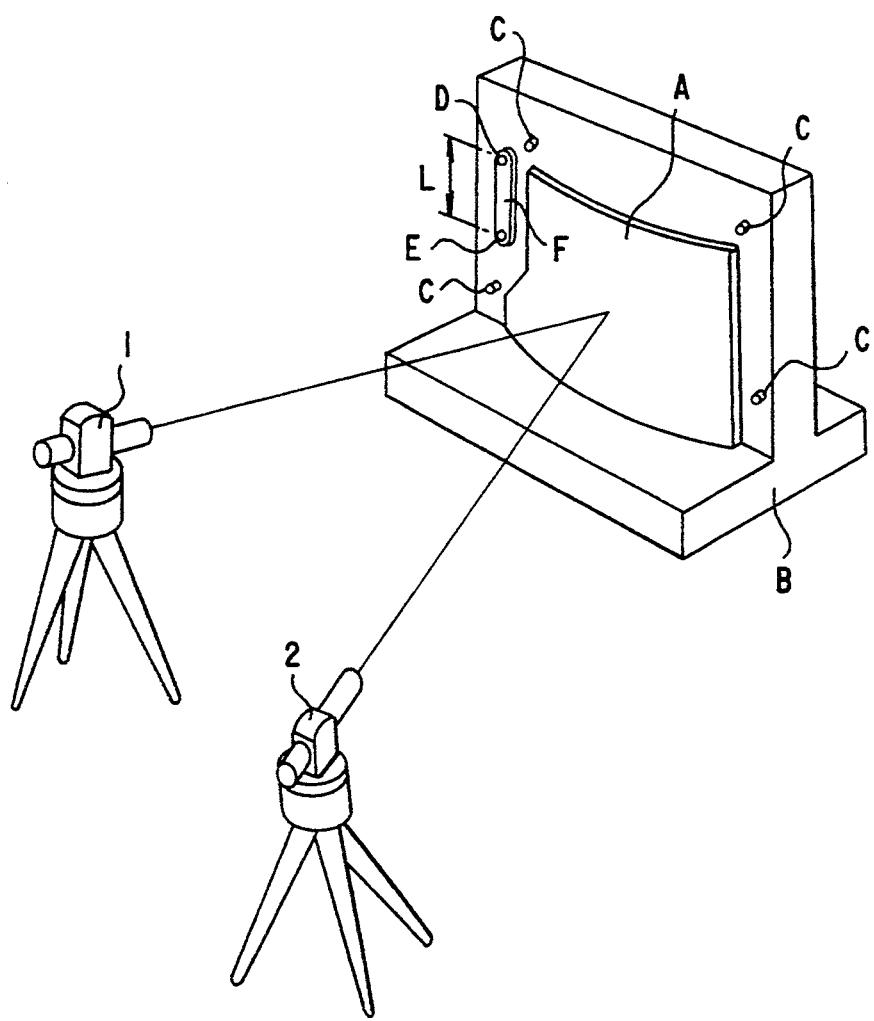
FIG. 3 is a perspective view showing an example of arrangement of a variety of measuring instruments used for executing a conventional method of measuring three-dimensional dimension of a measurable workpiece.
Figure 4:
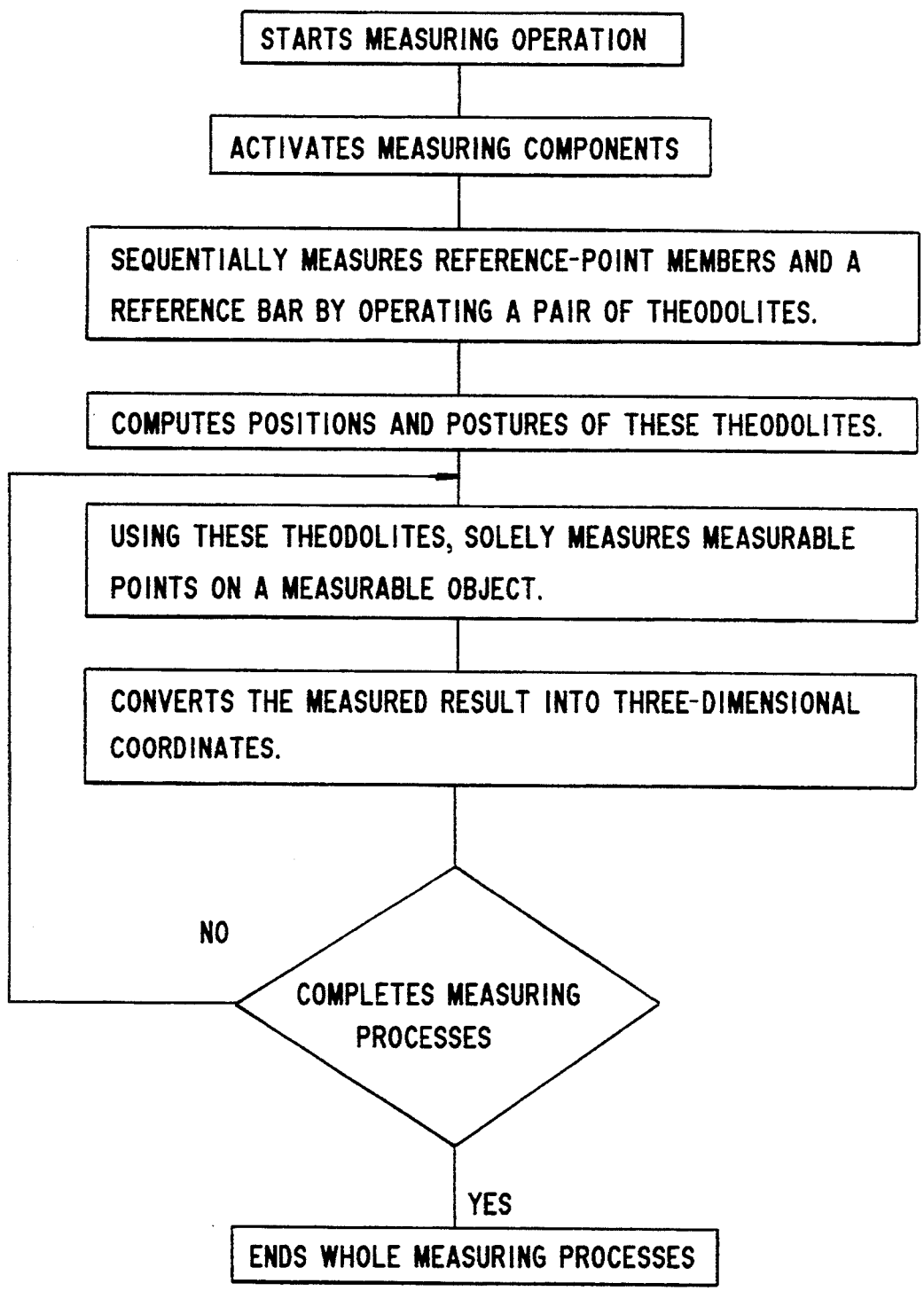
FIG. 4 is an operational flowchart designating procedure to implement the conventional method of measuring three-dimensional dimension of a measurable workpiece.

FIG. 2 presents an operational flowchart designating sequential procedure for executing the three-dimensional measuring processes described above.

As is apparent from the above description, the invention provides a novel method of measuring three-dimensional dimension of a measurable object A by installing a plurality of reference-point members to at least four locations in the periphery of or on the objective workpiece A and by providing a reference bar having a known distance between a pair of points thereof. In the course of computing positions of those measurable points based on image data transmitted from a plurality of CCD cameras provided for the system, initially, the computer unit computes absolute positions of these CCD cameras based on horizontal and vertical angles of those reference-point members and two points of the reference bar against light axes of those CCD cameras and also based on the distance between those two points of the reference bar among image data transmitted from those CCD cameras. Next, based on these data as reference, the computer unit computes positions of measurable points. Furthermore, whenever those image data vary, the computer unit correctively computes absolute positions of respective CCD cameras. By virtue of the provision of the above measuring system, even when the positional relationship between those CCD cameras and the objective workpiece varies as a result of transmission of unwanted vibration to the floor of the measuring location while spending a certain period of time for executing the dimensional measurement, the three-dimensional measuring system according to the invention can constantly follow up measuring processes while sequentially correcting the varied effect on the other hand. And yet, the varied positional relationship does not cause error to be generated in the measured result. Therefore, the novel three-dimensional dimension measuring system according to the invention can constantly execute three-dimensional measurement of objective workpieces with unsurpassed precision.

What is claimed is:

1. A method of measuring three-dimensional dimensions of a measurable object by computing positions of a predetermined number of measurable points on said measurable object based on image data transmitted from a plurality of CCD cameras, comprising:

installing a plurality of reference-point members to at least four locations in the periphery of or on said measurable object;

installing a reference bar in the periphery of or on said measurable object, said reference bar having a known distance between a pair of points thereof;

computing absolute positions of said CCD cameras based on horizontal and vertical directional angles of said reference-point members and the pair of points of said reference bar as determined by light axes of said CCD cameras represented by said image data and based on the known distance between the pair of points of said reference bar;

computing positions of respective measurable points based on the absolute positions of the CCD cameras and the image data; and correctively computing absolute positions of said CCD cameras whenever said image data vary.

* * * * *